United States Patent
Peterson et al.

(10) Patent No.: US 11,860,609 B2
(45) Date of Patent: Jan. 2, 2024

(54) SINGLE PAIR ETHERNET FOR OPERATOR CONTROL STATIONS

(71) Applicant: ROCKWELL AUTOMATION TECHNOLOGIES, INC., Mayfield Heights, OH (US)

(72) Inventors: Corey A. Peterson, Grafton, WI (US); Roberto S. Marques, Cedarburg, WI (US); Yutao Wang, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 17/483,363

(22) Filed: Sep. 23, 2021

(65) Prior Publication Data

US 2023/0106122 A1    Apr. 6, 2023

(51) Int. Cl.
| | | |
|---|---|---|
| *G06F 15/16* | (2006.01) | |
| *G05B 19/418* | (2006.01) | |
| *G05B 19/414* | (2006.01) | |
| *G05B 19/042* | (2006.01) | |
| *H04L 12/28* | (2006.01) | |

(52) U.S. Cl.
CPC ..... *G05B 19/4185* (2013.01); *G05B 19/0423* (2013.01); *G05B 19/4147* (2013.01); *H04L 12/283* (2013.01)

(58) Field of Classification Search
CPC ............ G05B 19/4185; G05B 19/0423; G05B 19/4147; H04L 12/283
USPC ........................................................ 709/224
See application file for complete search history.

(56) References Cited

U.S. PATENT DOCUMENTS

| | | |
|---|---|---|
| 11,114,783 B1 | 9/2021 | Wang et al. |
| 2008/0300694 A1 | 12/2008 | Dorgelo et al. |
| 2013/0178984 A1 | 7/2013 | Xu et al. |
| 2014/0335732 A1* | 11/2014 | Oberski ............... H01R 12/718 439/626 |
| 2019/0174207 A1* | 6/2019 | Cella ........................ H04Q 9/00 |
| 2020/0103878 A1 | 4/2020 | Sayyarrodsari et al. |
| 2020/0296856 A1* | 9/2020 | Byers ................... H05K 7/1492 |

(Continued)

FOREIGN PATENT DOCUMENTS

KR    20100001414 A    1/2010

OTHER PUBLICATIONS

European Search Report EP Application No. 22195085.0, dated Jan. 27, 2023 (11 pages).

*Primary Examiner* — Karen C Tang
(74) *Attorney, Agent, or Firm* — Fletcher Yoder, P.C.

(57) ABSTRACT

An operator control station of an industrial automation system includes at least one input interface to receive a user input and a communication interface to communicate with one or more devices of the industrial automation system, including a first device via an Ethernet communication protocol. The operator control station also includes a controller communicatively coupled to the communication interface. The controller performs operations including generating a signal based on the user input and the signal instructs the first device to control at least one component of the industrial automation system. The controller also performs operations including providing the signal to the communication interface for transmission to the first device via the Ethernet communication protocol.

16 Claims, 9 Drawing Sheets

(56) References Cited

U.S. PATENT DOCUMENTS

| | | | |
|---|---|---|---|
| 2021/0058498 A1* | 2/2021 | Iyer | H04L 7/0016 |
| 2022/0141290 A1* | 5/2022 | Chelmecki | H04L 12/40045 |
| | | | 709/220 |
| 2022/0224805 A1* | 7/2022 | Gant | H04N 5/2257 |

* cited by examiner

SINGLE PAIR ETHERNET FOR OPERATOR CONTROL STATIONS

BACKGROUND

The present disclosure generally relates to implementing Single Pair Ethernet (SPE) into industrial drive applications and, more particularly, to implementing Single Pair Ethernet (SPE) into operator control stations.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

Industrial automation systems may include automation control and monitoring systems. The automation control and monitoring systems may monitor statuses and/or receive information from a wide range of devices, such as valves, electric motors, a wide range of sensors, other suitable monitoring devices, and the like. One or more components of the automation control and monitoring systems, such as programming terminals, automation controllers (e.g., programmable logic controllers (PLCs) or programmable logic devices (PLDs), input/output (I/O) modules, communication networks, operator control stations, and the like may use the statuses and/or received information to provide alerts to operators to change or adjust operation of one or more devices of the industrial automation system (e.g., such as adjusting operation of one or more actuators), to manage the industrial automation system, or the like.

Operator control stations may be implemented using hardwire connections. The use of hardwire implemented control stations involves additional cabling, installation costs, and product costs. Moreover, the operator control stations may also send commands to one or more drives within a control cabinet of the industrial automation system. The drives may be connected to an Ethernet network and the control system of each drive may receive commands and use statuses and/or information to make control decisions. However, hardwire connecting the operator control stations to a communication network may result in a bundle of cables, which may be cumbersome, error-prone, and susceptible to latency issues.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an operator control station of an industrial automation system includes at least one input interface to receive a user input and a communication interface to communicate with one or more devices of the industrial automation system, including a first device via an Ethernet communication protocol. The operator control station also includes a controller communicatively coupled to the communication interface. The controller performs operations including generating a signal based on the user input and the signal instructs the first device to control at least one component of the industrial automation system. The controller also performs operations including providing the signal to the communication interface for transmission to the first device via the Ethernet communication protocol.

In another embodiment, an industrial automation system includes a drive configured to receive a first alternative current (AC) voltage from a power source and provide a second AC voltage to a load device, the drive including a control system. The system also includes at least one input interface to receive a user input. The system also includes a communication interface to communicate with the drive and communicatively coupled to the control system. The communication interface communicates using an Ethernet communication protocol. The system also includes a controller communicatively coupled to the communication interface. The controller performs operations including generating a signal based on the user input. The signal is instructs the control system to operate the drive. The controller also performs operations including providing the signal to the communication interface for transmission to the drive via the Ethernet communication protocol.

In a further embodiment, a method including receiving, via a user input interface of an operator control station, a user input. The operator control station includes a communication interface to communicate with one or more devices of an industrial automation system, including a first device via an Ethernet communication protocol. The method also includes generating, via a controller of the operator control station, a signal based on the user input. The signal instructs the first device to control at least one component of the industrial automation system. The method also includes providing the signal to the communication interface for transmission to the first device according to a Single Pair Ethernet (SPE) communication protocol and transmitting the signal via the communication interface.

DRAWINGS

These and other features, aspects, and advantages of the present disclosure will become better understood when the following detail description is read with reference to the accompanying drawings in which like characters represent like parts throughout the drawings, wherein.

DETAILED DESCRIPTION

Figure 1:
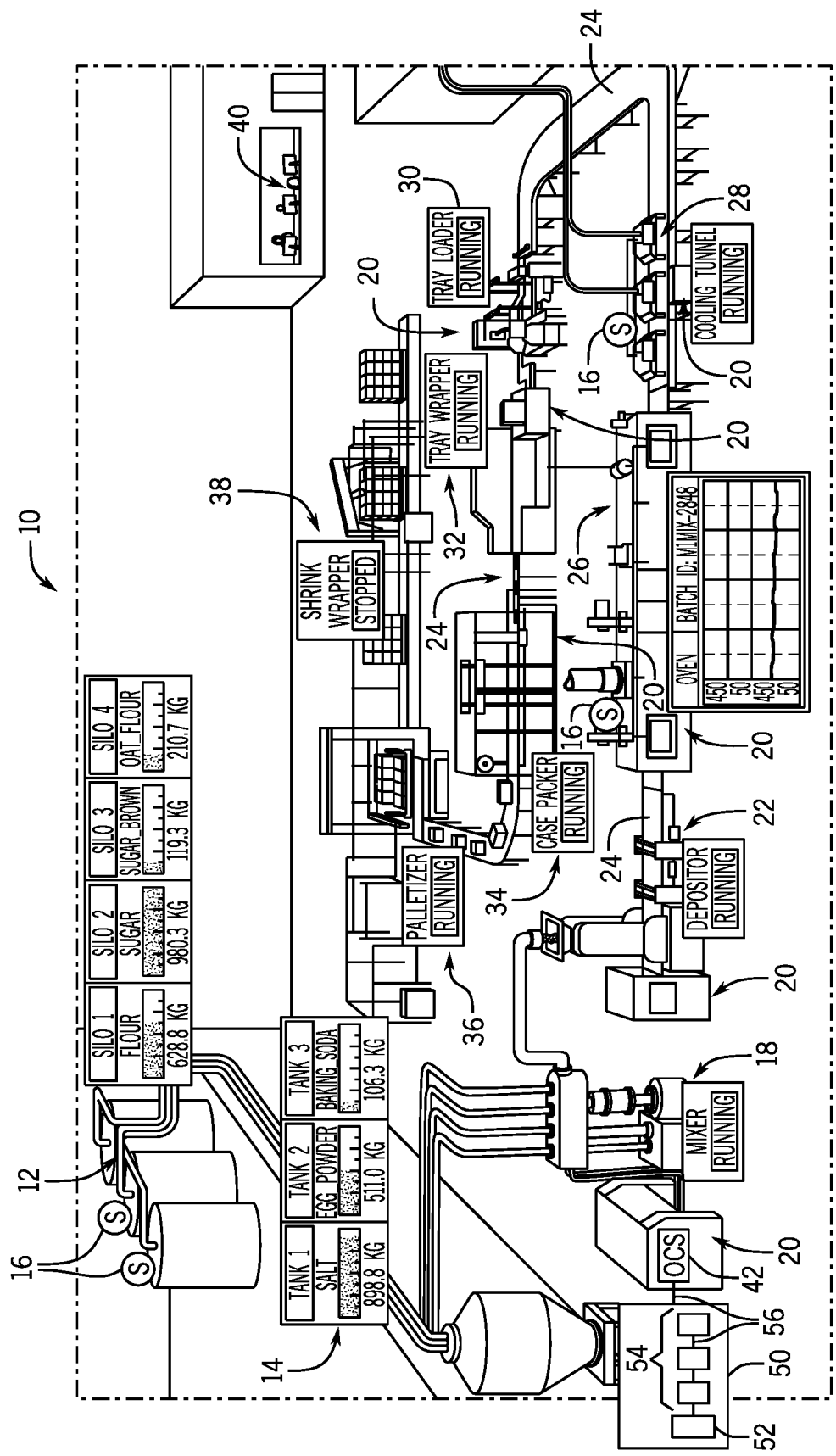
FIG. 1 illustrates an example industrial automation system employed by a food manufacturer, in accordance with embodiments presented herein.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

Industrial automation systems may be used in various contexts, such as a manufacturing plant, a resource extraction system, a hydrocarbon extraction site, a chemical refinery facility, an industrial plant, a power generation system, a mining system, a brewery, or the like. For example, in a resource extraction system context, a drive associated with a control system may control load and position of a rod pump to perform an oil extraction process. Although examples are provided with regard to specific contexts, one of ordinary skill in the art will recognize that these examples are not intended to be limiting and that the techniques described herein can be used with any suitable context.

To improve operation of industrial automation systems, components of the industrial automation system (e.g., supervisory control system) may monitor performance of one or more devices (e.g., operator control station) with respect to the industrial automation process as a whole. Statuses and/or information from the one or more components (e.g., supervisory control system) may be transmitted to respective control systems of drives associated with the one or more devices via an Ethernet network. Respective control systems of the drives may use the statuses and/or information to make control decisions related to the one or more devices controlled or coupled to the drive. As mentioned above, each drive may be housed in a control cabinet associated with the industrial automation system, and each drive may include a control system to control operations of respective components (e.g., load devices, motor). To enable the supervisory control system to receive statuses and/or information from the one or more devices (e.g., operator control station), each device may be connected to an Ethernet network. In some cases, each device may be connected to the Ethernet network via a separate Ethernet cable. However, wiring each device to the Ethernet network via an Ethernet cable may be cumbersome, cost inefficient, and result in a bundle of Ethernet cables, which may be difficult to maintain.

As such, it may be desirable to connect operator control stations to the Ethernet network while reducing the number of wires and overall installation cost, increasing transmission speed, and the like. Accordingly, the present disclosure provides techniques for connecting operator control stations using a single pair Ethernet (SPE) cable.

As used herein, single pair Ethernet (SPE) conductors may include a single pair of twisted wire for transmitting and receiving data. Non-limiting examples of SPE conductors include SPE cables, SPE wires, SPE traces, and SPE bars. As used herein, a gateway communication device may be a communication device that is directly (e.g., no intervening components) connected to the Ethernet network. The gateway communication device may serve to connect two or more networks and provide a routing function. That is, the gateway communication device may receive data or status information from components (e.g., supervisory control systems) of the industrial automation system from the Ethernet network and facilitate routing of the data or status information to respective destination drives. The gateway communication device may also receive data (e.g., control signal) from other drives and facilitate routing of the data to respective destination components via the Ethernet network. Based on the data or status information received via the gateway communication device (e.g., performance of the component), a respective control system of a respective drive may make a control decision. A drive may control torque, power, speed, direction, or any suitable operation of a respective component. For example, a variable frequency drive (VFD) may control a speed of a motor based on a command received from the gateway communication device via the Ethernet network. The SPE conductors may be used to couple the operator control stations to the Ethernet network, such as, via the gateway device.

By way of introduction, FIG. 1 illustrates an example industrial automation system 10 employed by a food manufacturer in which the present embodiments described herein may be implemented. It should be noted that although the example industrial automation system 10 of FIG. 1 is directed at a food manufacturer, the present embodiments described herein may be employed within any suitable industry, such as automotive, mining, hydrocarbon production, manufacturing, and the like. That is, the following brief description of the example industrial automation system 10 employed by the food manufacturer is provided herein to help facilitate a more comprehensive understanding of how the embodiments described herein may be applied to industrial devices to significantly improve the operations of the respective industrial automation system based on the current configuration of the equipment in the industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals and preservatives. In some embodiments, sensors 16 may be positioned within or around the silos 12, the tanks 14, or other suitable locations within the example industrial automation system 10 to measure certain properties, such as temperature, mass, volume, pressure, humidity, and the like.

The raw materials be provided to a mixer 18, which may mix the raw materials together according to a specified ratio. The mixer 18 and other machines in the example industrial automation system 10 may employ certain industrial automation devices 20 to control the operations of the mixer 18 and other machines. The industrial automation devices 20 may include controllers, input/output (I/O) modules, motor control centers (MCCs), motors, human machine interfaces (HMIs), operator control stations, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the example industrial automation system For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the example industrial automation system 10, monitor the operations of the respective device, communicate data regarding the respective device to a supervisory control system 40, and the like. In some embodiments, each industrial automation device 20 or a group of industrial automation devices 20 may be controlled using an operator control station 42. The operator control station 42 may generate and/or receive data regarding the operation of the respective industrial automation device 20, other industrial automation devices 20, user inputs, and other suitable inputs to control the operations of the respective industrial automation device(s) 20.

The operator control station 42 may have access to configuration data associated with the connected industrial automation devices 20. That is, the operator control station 42 may include memory or a storage component that stores information concerning the configuration of each industrial automation device 20 connected to it. In some embodiments, the information or configuration data may be populated or input by an operator at the time the respective industrial automation device 20 is installed. Additionally, the operator control station 42 may query the connected industrial automation device 20 to retrieve configuration data, such as model number, serial number, firmware revision, assembly profile, and the like. In some embodiments, the supervisory control system 40 may collect configuration data from multiple operator control stations 42 and store the information in a suitable memory or storage component.

In some embodiments, the industrial automation devices 20 (e.g., operator control stations) may include a communication feature that enables the industrial automation devices 20 to communicate data between each other and other devices. The communication feature may include a network interface that may enable the industrial automation devices 20 to communicate via various protocols such as Ethernet/IP, ControlNet, DeviceNet, ProfiNet, ModBus TCP, BacNet/IP, or any other industrial communication network protocol. Alternatively, the communication feature may enable the industrial automation devices (e.g., operator control stations) to communicate via various wired, such as Ethernet (e.g., single pair Ethernet (SPE), drive serial interface (DSI), and the like, or wireless communication protocols, such as Wi-Fi, mobile telecommunications technology (e.g., 2 G, 3 G, 4 G, LTE, 5 G), Bluetooth, near-field communications technology, and the like).

As mentioned above, the industrial automation devices 20 may be controlled using a local control system. In certain embodiments, the local control system may be disposed within a respective drive 54. One or more drives 54 may be disposed in a control cabinet (e.g., a low voltage motor control center 50) of the industrial automation system 10. Along with the one or more drives 54, the control cabinet may include one or more gateway communication devices 52 of the industrial automation system 10. In some embodiments, the one or more gateway communication devices 52 may be enclosed in a different housing than the one or more drives 54. For example, each gateway communication device 52 may be enclosed in a separate housing than each drive 54. In other embodiments, at least one gateway communication device 52 and at least one drive 54 may be integrated together in a common housing.

The gateway communication device 52 may receive data (e.g., status information) from components (e.g., supervisory control system, operator control station) of the industrial automation system 10 via a communication network (e.g., Ethernet network) and may facilitate routing of the data to a respective destination drive via Ethernet connection 56. In some embodiments, the gateway communication device 52 may be a drive with the ability to interface with the communication network. Based on receiving data form components of the industrial automation system 10 via the gateway communication device 52, a respective drive 54 may make a control decision. In some embodiments, the components, such as the supervisory control system, the operator control station, and the like, may make the control decision, and the gateway communication device 52 may transmit the data related to the control decision to a respective drive 54. For example, the drive 54 may control torque, power, speed, direction, or any suitable operation of a respective industrial automation device 20 (e.g., load device). That is, the drive 54 may include drive circuitry, such as switches (e.g., diodes, IGBTs, thyristors), that convert single-phase or multi-phase alternating current (AC) voltage into a controllable AC voltage that may be used to perform control operations for a load device, such as a motor. In addition, the gateway communication device 52 may receive data from the drives 54 via the Ethernet connection 56 and route the data to components via the communication network.

Figure 2:
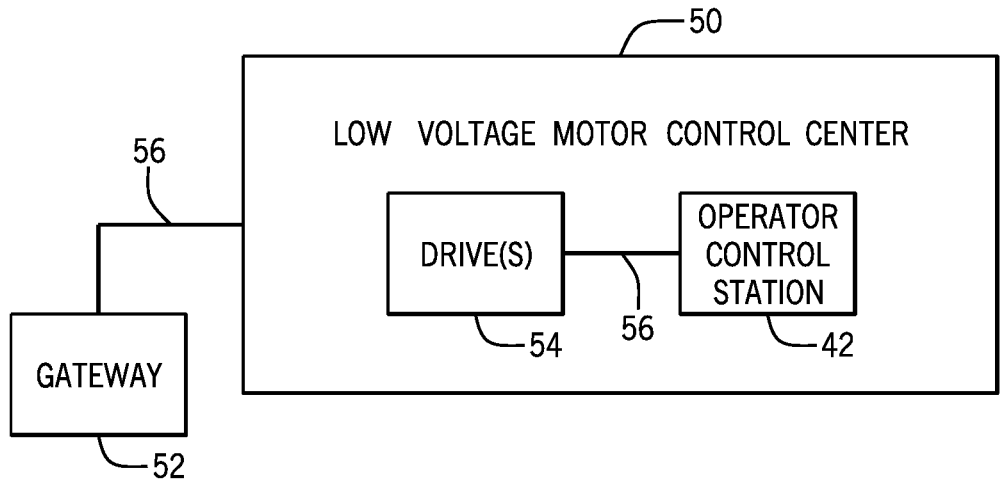
FIG. 2 illustrates a schematic diagram of an embodiment of a low voltage motor control center including an operator control station, in accordance with embodiments presented herein.

With the foregoing in mind, FIG. 2 illustrates an embodiment of the low voltage motor control center 50 including the operator control station 42, in accordance with an embodiment of the present disclosure. The low voltage motor control center 50 may include one or more drives 54 to control one or more motors. Each drive 54 may include a control system for controlling the one or more motors and may also include a communication component, a processor, a memory, a storage unit, input/output ports, an image sensor (e.g., a camera), a location sensor, a display, additional sensors (e.g., vibration sensors, temperature sensors), and the like. The communication component may be a wireless or wired communication component that may facilitate communication between the drive 54 and other devices (e.g., the operator control station 42). The operator control station 42 may be communicatively coupled to the gateway 52, the one or more drives 54, and/or any other devices of the industrial automation system via the Ethernet connection 56. The operator control station 42 may generate and may transmit data and/or signals via the Ethernet connection 56 to the gateway 52, the one or more drives 54, and/or any other suitable devices and may transmit the data and/or signals according to a SPE Ethernet protocol. For example, the operator control station 42 may receive a user input via one or more user input interfaces, as described herein, and may generate and may transmit signals and/or data based on the received user input.

In some embodiments, the gateway 52 may receive control signals from other control systems (e.g., the operator control station) via the Ethernet connection 56 and may provide these signals to each drive 54. In some embodiments, the Ethernet connection 56 may be implemented by a ribbon cable and may include multiple (e.g., seven) wires. For example, the ribbon cable may transmit a select signal, a network power positive signal, a network power negative signal, a control power positive signal, a control power negative signal, and a Single Pair Ethernet (SPE) cable via seven conductors. The SPE may include one pair of conductors to facilitate Ethernet transmission of data. The SPE conductors may carry a SPE positive signal and a SPE negative signal, which may provide network communication functionality across the Ethernet network and to each device connected to the Ethernet network. The SPE positive signal and SPE negative signal may be a part of a bus and/or multi-drop topology (e.g., a topology where multiple data endpoints couple to a same communication bus). Communication transmitted via the SPE conductors may follow the SPE Ethernet protocol. By communicatively coupling the operator control station 42 and other components of the industrial automation system via the gateway 52 and the SPE conductors, the present embodiment reduces the size of the communication cables used to interconnect different components via an Ethernet network as compared to other communication conductors including standard Ethernet cables. Moreover, the SPE conductors provide for up to 10 Megabytes/second transmission rate across 1,000 meters, thereby enabling multiple components to be connected to the gateway 52.

Figure 3:
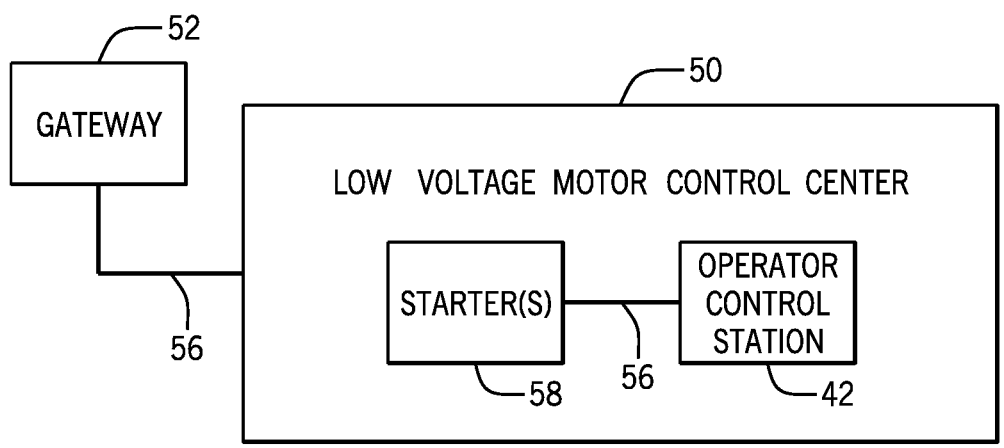
FIG. 3 illustrates a schematic diagram of another embodiment of a low voltage motor control center including an operator control station, in accordance with embodiments presented herein.

With the foregoing in mind, FIG. 3 illustrates an embodiment of the low voltage motor control center 50 including the operator control station 42, in accordance with an embodiment of the present disclosure. The low voltage motor control center 50 may include one or more starters 58 and each starter 58 may include one or more safety relays and/or one or more safety contactors. The one or more starters 58 may include Low Voltage Soft Starters, Medium Voltage Soft Starters, Low Voltage Starters, or any combination thereof. Each starter 58 may start and monitor motors and drives of the industrial automation system. The operator control station 42 may be communicatively coupled to the gateway 52, the one or more starters 58, and/or any other devices of the industrial automation system via the Ethernet connection 56. The operator control station 42 may generate and may transmit data and/or signals via the Ethernet connection 56 to the gateway 52, the one or more starters 58, and/or any other suitable devices and may transmit the data and/or signals according to a SPE Ethernet protocol. For example, the operator control station 42 may receive a user input via one or more user input interfaces, as described herein, and may generate and may transmit signals and/or data based on the received user input.

Figure 4:
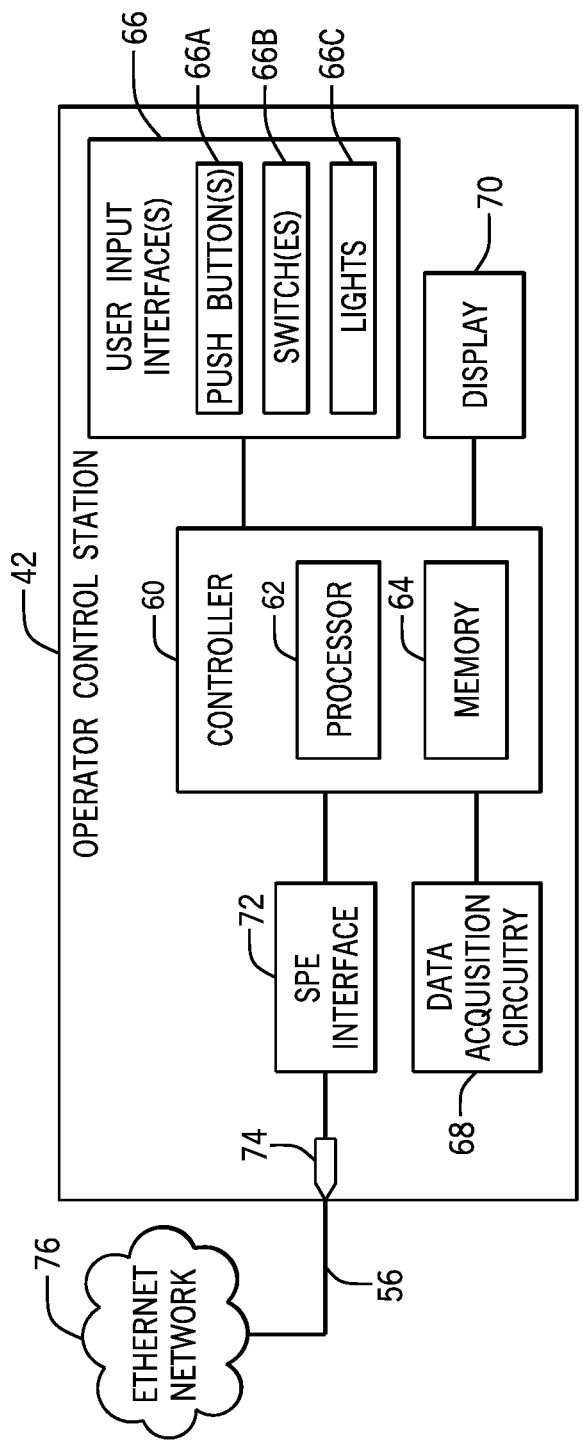
FIG. 4 illustrates a schematic diagram of an operator control station, in accordance with embodiments presented herein.

With the foregoing in mind, FIG. 4 illustrates a schematic diagram of the operator control station 42, in accordance with an embodiment of the present disclosure. The operator control station 42 may include a controller 60 that may control operation of the control station 42 and may process data acquired by the operator control station 42. The controller 60 may be provided in the form of a computing device, such as a programmable logic controller (PLC). The controller 60 may include at least one processor, such as processor 62, and at least one memory, such as memory 64. In the illustrated embodiment, the operator control station 42 may also include user input interface(s) 66, data acquisition circuitry 68, a display 70, and an SPE communication interface 72. The processor 62 may process acquired data and/or may translate acquired data to provide communication via the SPE communication interface 72 coupled to an Ethernet network 76. For example, the processor 62 may transmit one or more data signals in the Ethernet communication protocol from the SPE communication interface 72 and communication port 74 to one or more devices communicatively coupled via the Ethernet connection 56 to the Ethernet network 76. Likewise, the controller 60 may receive data signals in the Ethernet communication protocol via the SPE communication interface 72 and communication port 74. In certain embodiments, the operator control station 42 may include additional elements not shown in FIG. 4, such as additional data acquisition and processing controls, additional display panels, multiple user interfaces, and so forth.

The user input interface 66 may be capable of receiving an input from a user to adjust operation of one or more devices of an industrial automation system. In some embodiments, the user input interface 66 may include any number of push buttons 66A, switches 66B (e.g., toggle switches, selector switches, and so forth), pendant stations, lights 66C (e.g., LEDs, pilot lights, and so forth), any other suitable operating interface, or any combination thereof. For example, the user input interface 66 may include a start push button to initiate an operation for a device of an industrial automation system, a stop push button to end operation/shut off operation of the device, a selector switch to select an operating mode of the device, and a pilot light to indicate faults with the operator control station and/or the device. In certain embodiments, the user input interface 66 may be a portion of the display 70. For example, the user input interface 66 may be a touch screen. In another embodiment, the input interface 66 may be a push button with an LED indicator that acts as the display 70. The display 70 may provide an indication of a current operating mode of the operator control station 42 and/or one or more devices of the industrial automation system. The display 70 may include one or more lights and/or an indication on a touch screen display to display an operating mode of the operator control station 42.

The data acquisition circuitry 68 may be communicatively coupled to the processor 62 and may include receiving and conversion circuitry. The data acquisition circuitry 68 may receive data from one or more devices of the industrial automation system and may transmit the data to the processor 62. In certain embodiments, the data acquisition circuitry 68 may be communicatively coupled to the SPE communication interface 72 and may receive data from one or more devices of the industrial automation system via the SPE communication interface 72. For example, the SPE communication interface 72 may be an Ethernet communication interface and may enable communication between the Ethernet network 76 and one or more devices of the industrial automation system.

In some embodiments, the memory 64 may include one or more tangible, non-transitory, computer-readable media that store instructions executable by the processor 62 and/or data to be processed by the processor 62. For example, the memory 64 may include random access memory (RAM), read only memory (ROM), rewritable non-volatile memory, such as flash memory, hard drives, optical discs, and/or the like. Additionally, the processor 62 may include one or more general purpose microprocessors, one or more application specific processors (ASICs), one or more field programmable gate arrays (FPGAs), or any combination thereof. Further, the memory 64 may store data obtained via one or more devices of the industrial automation system and/or algorithms utilized by the processor 62.

The SPE communication interface 72 may enable communication between the operator control station 42 and components (e.g., gateway(s), motor(s), drive(s), starter(s), and so forth) of an industrial automation system via the Ethernet network 76. The Ethernet network 76 may be a logical partition of a network and each device connected to the logical partition may have a portion (e.g., identifier) of an associated Internet Protocol (IP) address that corresponds to the logical partition. In certain embodiments, the processor 62 may receive and/or may translate data signals between the Ethernet communication protocol and any other suitable communication protocol to facilitate generation and transmission of signals from the operator control station 42 to one or more components of the industrial automation system. For example, the processor 62 may receive and/or may transmit data signals via the SPE communication interface 72 and communication port 74. In some embodiments, the operator control station 42 may be communicatively coupled to the Ethernet network 76 via the Ethernet connection 56 (e.g., SPE conductors).

Figure 5:
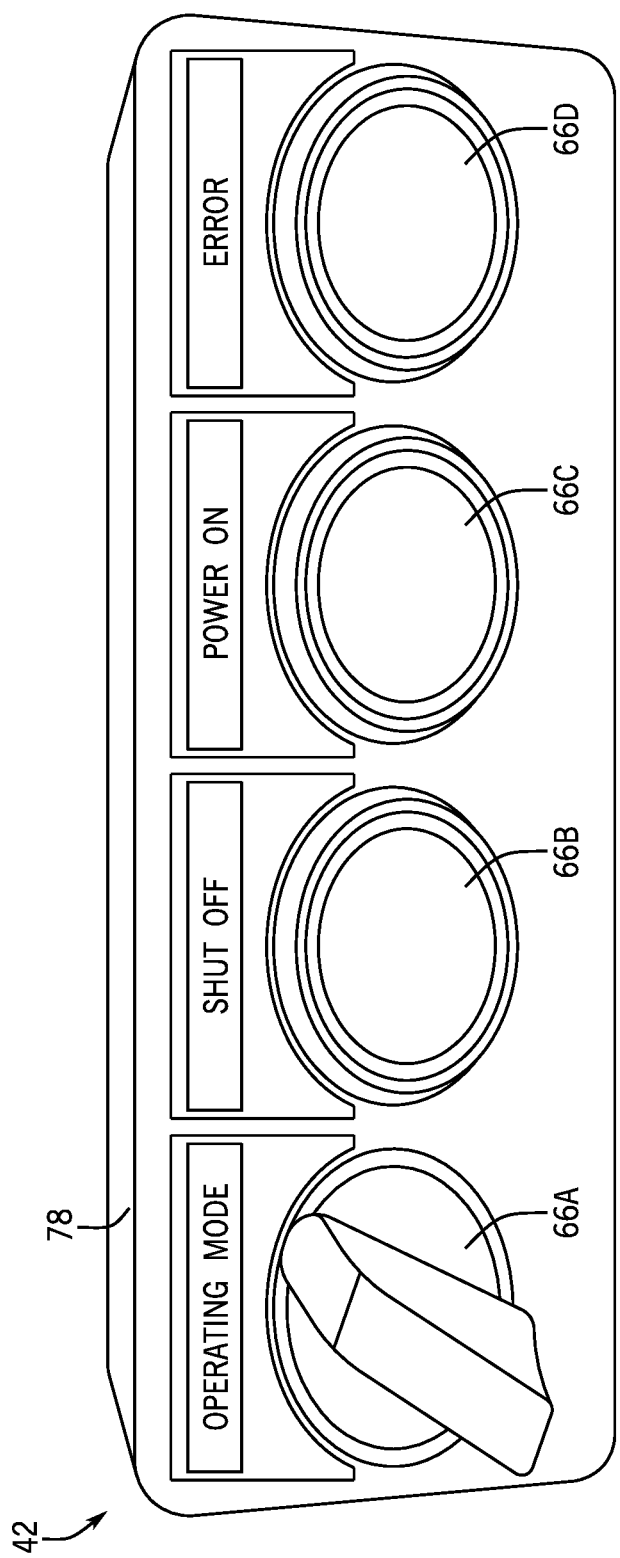
FIG. 5 illustrates an embodiment of the operator control station, in accordance with embodiments presented herein.

With the foregoing in mind, FIG. 5 illustrates an example embodiment of the operator control station 42, in accordance with an embodiment of the present disclosure. The operator control station 42 may include any number of user input interfaces, such as user input interfaces 66A, 66B, 66C, 66D. In certain embodiments, a first user input interface 66A may be a selector switch and may adjust an operating mode of one or more devices of the industrial automation system. For example, the selector switch may be moved to select a desired operating mode for one or more devices. In response to movement of the selector switch and selecting the desired operating mode, the processor of the operator control station 42 may generate and may transmit a signal to one or more devices and/or to a gateway to adjust operation of the one or more devices. For example, the signal may instruct the one or more devices to operate according to the selected operating mode and/or the signal may instruct the gateway to generate and transmit a second signal to adjust the operating mode of the one or more devices according to the selected operating mode.

In some embodiments, a second user input interface 66B may be a push button and may power down and/or shut off operation of one or more devices of the industrial automation system. For example, the processor of the operator control station 42 may generate and may transmit a signal in response to the second user input interface 66B receiving an input from a user. Additionally or alternatively, the second user input interface 66B may include an indicator to provide a visual indication of a power status (e.g., power off) of the one or more devices. For example, the second user input interface 66B may include a red pilot light that may activate to indicate no power is currently supplied to the one or more devices. In certain embodiments, a third user input interface 66C may be a second push button and may power on and/or start operation of one or more devices of the industrial automation system. For example, the processor of the operator control station 42 may generate and may transmit a signal in response to the third user input interface 66C receiving an input from a user. Additionally or alternatively, the third user input interface 66C may include an indicator to provide a visual indication of a power status (e.g., power on) of the one or more devices. For example, the third user input interface 66C may include a green pilot light that may activate to indicate power is currently supplied to the one or more devices.

A fourth user input interface 66D may be a pilot light to provide a visual indication of an error and/or fault associated with one or more devices and/or the operator control station 42. For example, the fourth user input interface 66D may be a yellow pilot light and may activate to indicate a fault and/or an error associated with the one or more devices. The operator control station 42 may also include a housing 78 and the housing may contain at least one of the components of the operator control station 42 of FIG. 4. In certain embodiments, the operator control station 42 may incorporate any number of user input interfaces and each user input interface may be a separate node of the In-cabinet Bus communication network. For example, each user input interface of the operator control station 42 may be connected in series and may pass generated messages to adjacent user input interfaces for transmission to a destination component associated with the generated message. As such, the wiring and installation of the operator control station 42 may be greatly simplified due to the connections. For example, a message transmitted via an In-cabinet Bus infrastructure disposed between a user input interface of the operator control station 42 and the destination component may not be interrupted by data or control signals transmitted from other user input interfaces or other components of the operator control station 42. That is, adjacent user input interfaces and/or components or intermediary user input interfaces and/or components between the user input interface of the operator control station 42 and the destination component may be bypassed during transmission of the single pair Ethernet (SPE) data packet. In some embodiments, the operator control station 42 may include one or more communication components (e.g., ports, modems, network switches) that couple to the single pair Ethernet (SPE) conductors 56 to transmit single pair Ethernet (SPE) data packets to the destination component.

While FIG. 5 illustrates four user input interfaces, in other embodiments, any number of user input interfaces may be included and many other embodiments are envisaged. For example, more or fewer user input interfaces may be included in other embodiments of the operator control station. Additionally or alternatively, the operator control station may include any number of user input interfaces, any number of push buttons, any number of switches, any number of LEDs, any other suitable indicators, any other suitable interfaces, and so forth.

Figure 6:
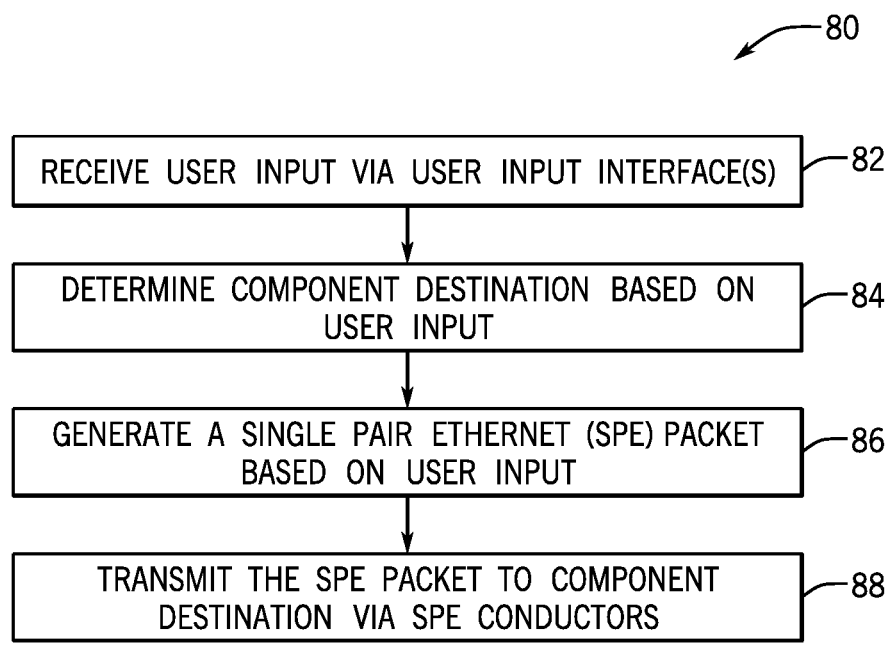
FIG. 6 illustrates a flowchart of a process for routing data from the operator control station to devices of the industrial automation system of FIG. 1, in accordance with embodiments presented herein.

With the foregoing in mind, FIG. 6 illustrates a flowchart of a process 80 for routing data (e.g., control instructions, status information and performance of load devices) from the operator control station to the components (e.g., gateway 52, control system of drives 54, starters 58, relays, and so forth), in accordance with an embodiment of the present disclosure. Although the following description of the process 80 will be discussed as being performed by the processor 62 of the operator control station 42, it should be noted that any suitable computing component may perform the process 80. In addition, although the process 80 is described in a particular order, it should be noted that the process 80 may be performed in any suitable order.

At block 82, the operator control station 42 may receive a user input, for example, at user input interface 66 of FIG. 4. The processor 62 may receive data associated with the user input and/or may parse and/or analyze the user input and generate data associated with the user input. Additionally or alternatively, the processor 62 may generate a control signal based on the user input. For example, the processor 62 may determine the user input corresponds to a pressing a shut off input interface and the processor 62 may generate a control signal to shut off and/or power down one or more devices of the industrial automation system.

At block 84, based on parsing and/or analyzing the user input received from the user input interface 66 of FIG. 4, the processor 62 may identify a component (e.g., drive 54, starter 58) that corresponds to the received user input. In some embodiments, the data associated with the user input includes a destination internet protocol (IP) address that helps operator control station 42 determine the destination component.

In some cases, the data associated with the user input received and/or generated by the operator control station 42 may not be in a format or a state that is suitable for being routed using the single pair Ethernet (SPE) conductors 56. As such, if the data is not in a suitable format, at block 86, the processor 62 may convert the data into a single pair Ethernet (SPE) data packet that is suitable for transmission via the single pair Ethernet (SPE) conductors 56. The single pair Ethernet (SPE) data packet includes internet protocol (IP) address, control information, load data, and so forth associated with single pair Ethernet (SPE) protocol.

Based on determining the destination component and converting the data to the single pair Ethernet (SPE) data packet, at block 88, the processor 62 may transmit the single pair Ethernet (SPE) data packet to the destination component via the via the single pair Ethernet (SPE) conductors 56. In some embodiments, the processor 62 may transmit the single pair Ethernet (SPE) data packet to the gateway 52 of FIG. 1, the gateway 52 may then forward the single pair Ethernet (SPE) data packet to a control system of the drive 54, and the drive 54 may forward the SPE data packet to an adjacent component, and so forth until the destination component receives the single pair Ethernet (SPE) data packet. That is, each control system of the respective component, upon receiving the single pair Ethernet (SPE) data packet, determines whether it is specified to process the single pair Ethernet (SPE) data packet. If the control system determines that it is indeed specified to process the single pair Ethernet (SPE) data packet, the control system processes the single pair Ethernet (SPE) data packet. Otherwise, the control system may forward the single pair Ethernet (SPE) data packet to an adjacent component without processing it. In other embodiments, the operator control station 42 may transmit the single pair Ethernet (SPE) data packet via an In-cabinet Bus directly to the destination control system without transmitting the packet to an intermediary control system. For example, a message transmitted via an In-cabinet Bus infrastructure disposed between the operator control station 42 and the destination component may not be interrupted by data or control signals transmitted from intermediary components. That is, adjacent components or intermediary components between the operator control station 42 and the destination component may be bypassed during transmission of the single pair Ethernet (SPE) data packet. In some embodiments, the operator control station 42 may include one or more communication components (e.g., ports, modems, network switches) that couple to the single pair Ethernet (SPE) conductors 56 to transmit single pair Ethernet (SPE) data packets to the destination component.

Figure 7:
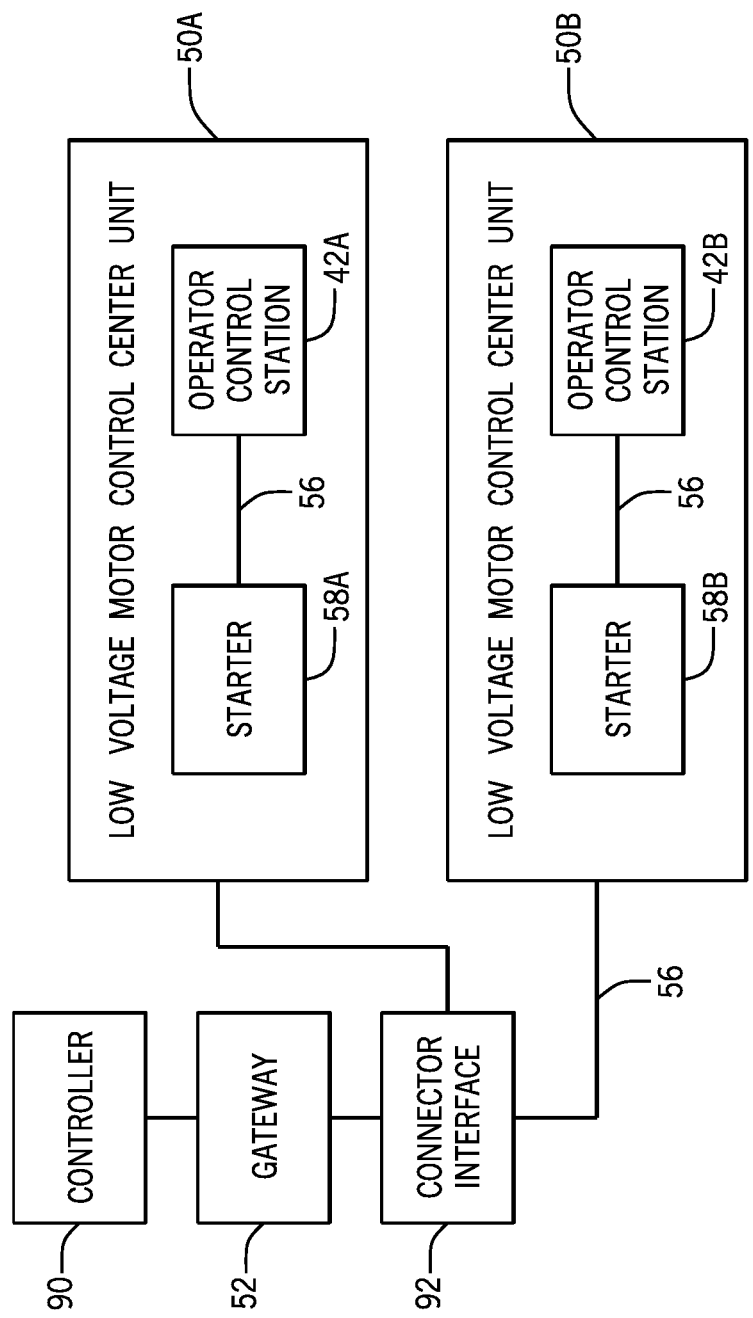
FIG. 7 illustrates a schematic diagram of another embodiment of a low voltage motor control center, in accordance with embodiments presented herein.

With the foregoing in mind, FIG. 7 illustrates a schematic diagram of low voltage motor control center units 50A, 50B, in accordance with embodiments of the present disclosure. The low voltage motor control center unit 50A may include any number of starters, such as starter 58A. In some embodiments, the low voltage motor control center units 50A, 50B may be a single low voltage motor control center having any number of starters and/or any number of corresponding operator control stations. Additionally or alternatively, the low voltage motor control center units 50A, 50B may be separate low voltage motor control centers. In certain embodiments, the low voltage motor control center unit 50A may include only the starter 58A. The low voltage motor control center unit 50A may include any type of starter, such as a full voltage non-reversible (FVNR) starter, a direct on-line (DOL) starter, a full voltage reversible (FVR) starter, or a direct on-line reversing (DOLR) starter. The operator control station 42A may be communicative coupled to the starter 58A via the SPE conductors 56 and may control one or more operations of the starter 58A. The operator control station 42A may be configured based on the type of starter 58A. For example, if the starter is a FVNR or DOL starter, the operator control station 42A may include at least four components, such as a first component (e.g., selector switch) to switch the starter 58A between automatic and manual operation, a second component (e.g., illuminating push button) to provide an indication of an operational status (e.g., running, stopped, fault, and so forth) of the starter 58A and to stop operation of the starter 58A, a third component (e.g., second illuminating push button) to provide a different indication of an operational status (e.g., running, stopped, fault, and so forth) of the starter 58A and to start operation of the starter 58A, and a fourth component (e.g., third illuminating push button) to provide another different indication of an operational status (e.g., running, stopped, fault, and so forth) of the starter 58A and to reset operation of the starter 58A.

The second operator control station 42B may be configured based on the type of starter 58B. For example, if the starter is a FVR or DOLR starter, the second operator control station 42B may include at least four components, such as a first component (e.g., a selector switch) to switch the second operator control station 42B between local mode and remote mode operation, a second component (e.g., a second selector switch) to switch operation (e.g., forward, reverse, off) of the starter 58B, a third component (e.g., LED indicator) to provide an indication of an operational status (e.g., running, stopped, fault, and so forth) of the starter 52B, and a fourth component (e.g., illuminating push button) to provide a different indication of an operational status (e.g., running, stopped, fault, and so forth) of the starter 52B and to reset operation of the starter 52B. In local mode operation, the second operator station 42B and starter 58B may communicate directly via the SPE conductors 56 and the second operator station 42B may directly control operation of the starter 58B. For example, the second operator station 42B and starter 52B may communicate without intermediate components, such as gateway 52 or any other suitable controller (e.g., a programmable logic device). In remote mode operation, the second operator station 42B and/or the starter 58B may be controlled by an intermediate component, such as gateway 52 or any other suitable controller (e.g., a programmable logic device). A connector interface 92 may couple the low voltage motor control center units 50A, 50B to the gateway 52 via the SPE conductors 56. The gateway 52 may supply DC power to the low voltage motor control center units 50A, 50B and a controller 90, the gateway 52, and/or the operator stations 42A, 42B may identify components on the In-cabinet Bus network. For example, the controller 90, the gateway 52, and/or the operator stations 42A, 42B may determine a type of starter and may program components (e.g., operator control station, starters, contactors) based on the type of starter. The controller 90 may be any suitable automation controller, such as a programmable logic device, a programmable logic controller, and the like. The controller 90 may be provided in the form of a computing device, such as a programmable logic controller (PLC). The controller 90 may include at least one processor and at least one memory. In some embodiments, the memory may include one or more tangible, non-transitory, computer-readable media that store instructions executable by the processor and/or data to be processed by the processor. For example, the memory may include random access memory (RAM), read only memory (ROM), rewritable non-volatile memory, such as flash memory, hard drives, optical discs, and/or the like. Additionally, the processor may include one or more general purpose microprocessors, one or more application specific processors (ASICs), one or more field programmable gate arrays (FPGAs), or any combination thereof. Further, the memory may store data obtained via one or more devices of the industrial automation system and/or algorithms utilized by the processor.

In some embodiments, the operator control station may include any number of modular components (e.g., user input interfaces) and the modular components may be selected based on a desired operation of the low voltage motor control center. For example, the number and/or the type of user input interfaces (e.g., selector switch, push button, LED indicator, and so forth) may be selected and configured according to a desired operation. In certain embodiments, the user input interfaces may be initially configured and/or reconfigured by any number of software operations. For example, the operator control station may be communicatively coupled to the Ethernet network via the SPE conductors and the operator control station may receive configuration instructions to configure any number of user input interfaces.

Figure 8:
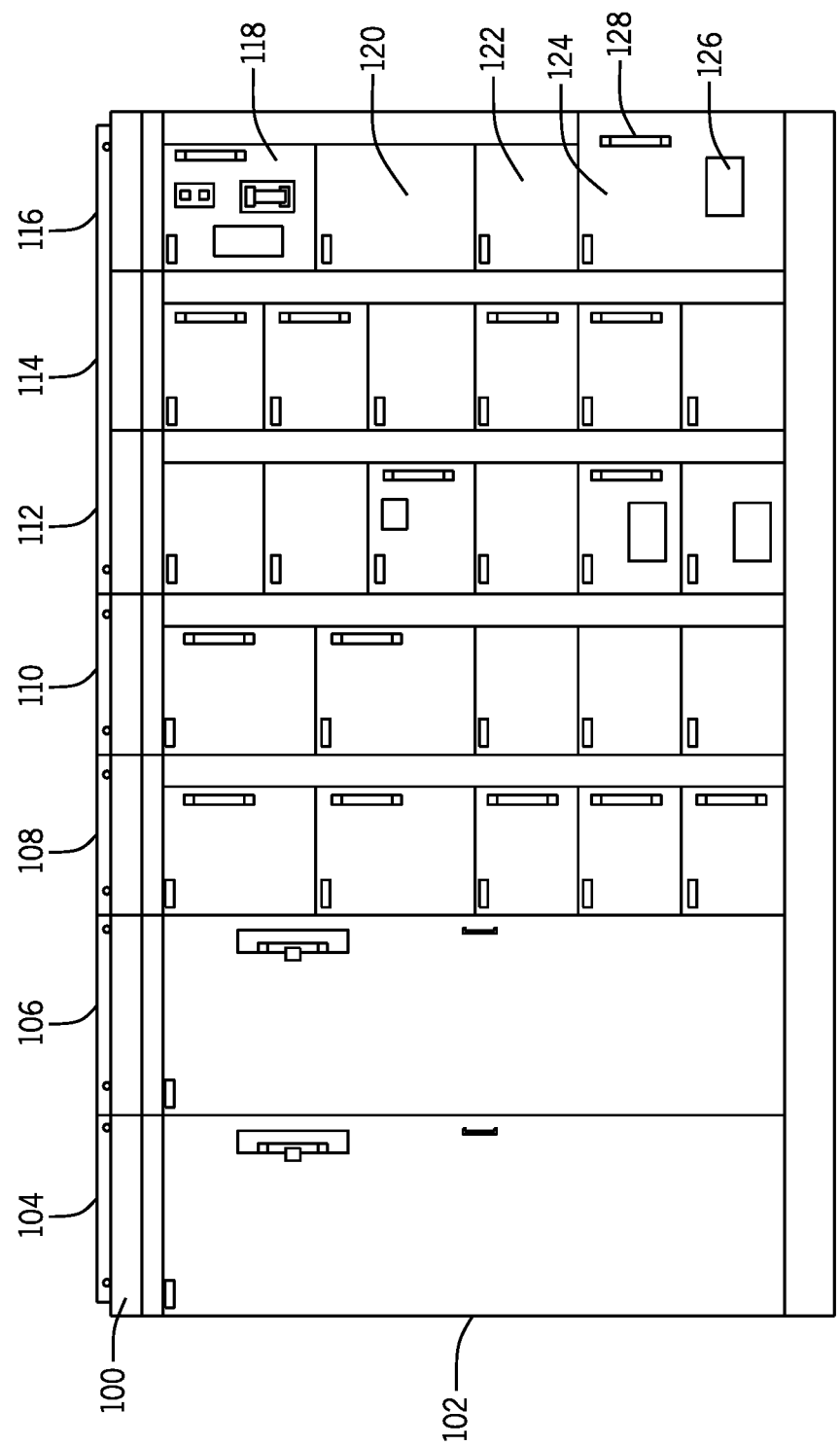
FIG. 8 is a front view of an embodiment of an MCC, in accordance with embodiments presented herein.

As mentioned above, in some complex industrial automation systems 10, one or more controllers and/or other industrial automation components (e.g., variable frequency drives (VFDs), PLCs, programmable automation controllers (PACs), contactors, starters, overload protection components, fuses, circuit breakers, disconnects, short circuit protectors, etc.) may be combined into an enclosure or cabinet and referred to as an MCC. FIG. 8 is a front view of an embodiment of an MCC 100. As shown, the MCC 100 includes an enclosure 102 that is divided into vertical sections 104, 106, 108, 110, 112, 114, 116. Each section may be further divided into one or more buckets 118, 120, 122, 124, which may be configured to receive units. The units may include, industrial automation components configured to perform industrial automation functions. The units may thus include, for example, motor controllers, VFDs, PLCs, PACs, contactors, starters, overload protection components, fuses, circuit breakers, disconnects, short circuit protectors, and so forth. In some embodiments, the size of each bucket 118, 120, 122, 124 may be customized to the type of unit the bucket 118, 120, 122, 124 is configured to receive. In other embodiments, different MCCs 100 may be available preconfigured with differently sized buckets. As shown, the cabinet doors 126 of some buckets may include disconnect switches 128 for disconnecting the respective unit from the MCC 100. Accordingly, to remove a unit, a user may actuate the disconnect switch 128 (e.g., from "on" to "off") to electrically disconnect the unit from the MCC 100. The user may then open the cabinet door 126, and physically remove the unit from the enclosure 102. If the unit is being replaced with a different unit, the new unit may be physically installed in the bucket 124, the cabinet door 126 closed, and the disconnect switch 128 actuated (e.g., from "off" to "on").

Figure 9:
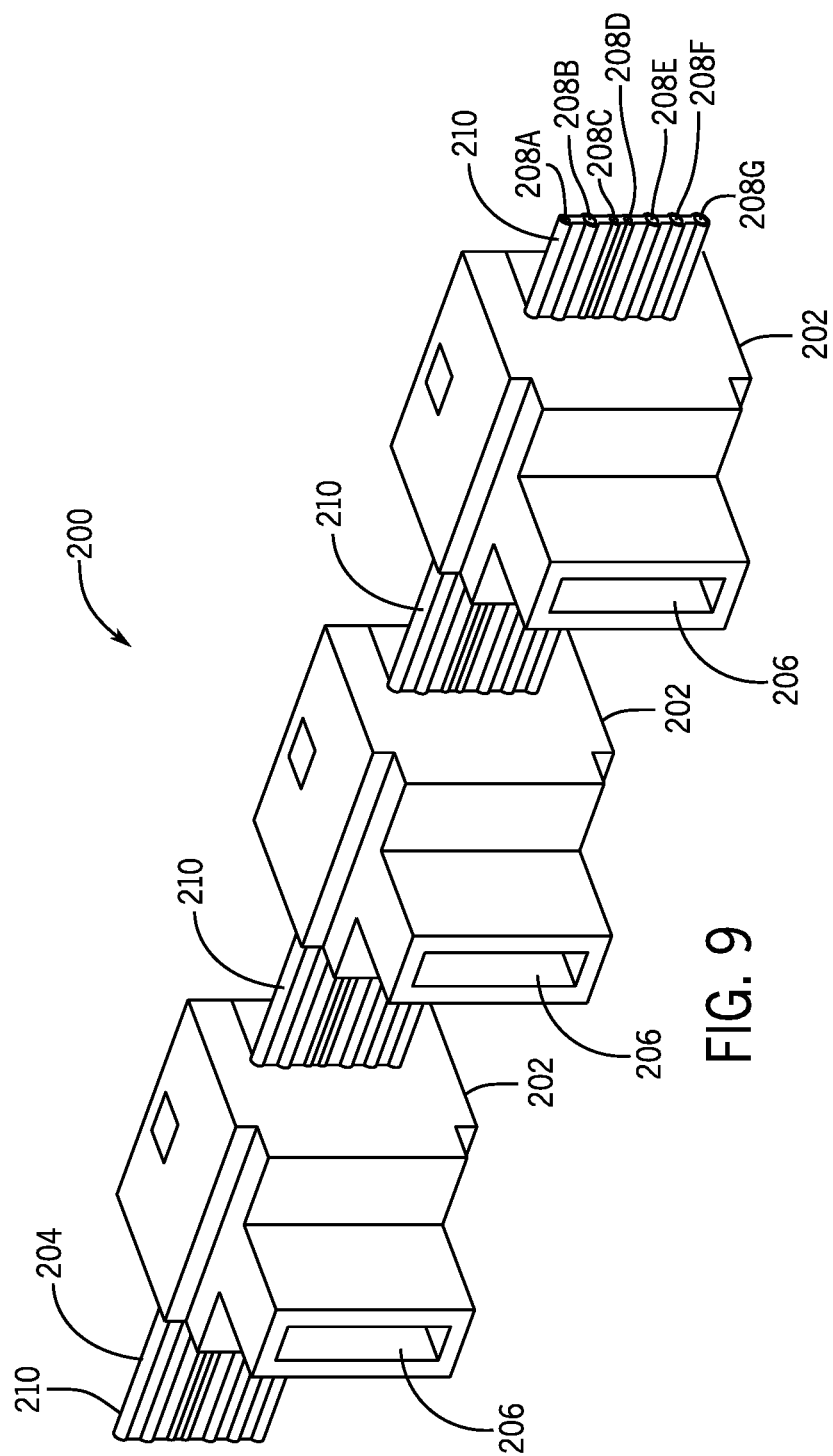
FIG. 9 is a perspective view of a portion of a multidrop cable used in the MCC of FIG. 8, in accordance with embodiments presented herein.

The units within an MCC 100 may join a wired In-cabinet Bus network by coupling to a multidrop cable that extends through the MCC enclosure 102. FIG. 9 depicts a portion of the multidrop cable 200 for use within the MCC 100 of FIG. 8. The illustrated portion of the multidrop cable 200 may include one or more terminals 202 positioned along transmission lines 204. The terminal 202 may include a slot 206 to facilitate electrical connection of an industrial automation device via a tap circuitry (not shown) to the transmission lines 204. A node may include the terminal 202 and a respective connected tap circuitry. In some embodiments, the terminals 202 may be referred to as "drops", while the portions of transmission lines 204 extending between terminals may be referred to as "trunks" 210. Accordingly, the term "multidrop" in multidrop cable 200 refers to the cable 200 having multiple terminals 202 to which components may be connected. The transmission lines 204 may include electrical conductors 208A-208G. It should be noted that different number of terminals 202 may be used in different embodiments with the multidrop cable 200 in the MCC 100.

The multidrop cable 200 may facilitate communication between the nodes using various communication protocols. Hence, the number of conductors of transmission lines 204 and the arrangement of the conductors may vary based on the communication protocol being used by the MCC 100. For example, the multidrop cable 200 may use an industrial Ethernet network protocol (EtherNet/IP). The terminals 202 may each include respective tap circuitry that may facilitate connection of various industrial automation components to the transmission lines 204 of the multidrop cable 200. The connectors may facilitate power transmission and/or communication between the input/output signals of the respective node and the transmission lines 204 of the multidrop cable 200.

The MCC 100 may facilitate data communication between different numbers of nodes in different configurations and different directions using the multidrop cable 200. For example, the MCC 100 may communicatively connect motor controllers, VFDs, PLCs, PACs, contactors, starters, overload protection components, fuses, circuit breakers, disconnects, short circuit protectors, etc. within the MCC 100 using one or multiple multidrop cables 200. Also, a node may take any shape or form as long as the connection adhere to the communication protocol of the multidrop cable 200. For example, a sensor may be positioned on a tap circuitry, and the tap circuitry may connect to a slot 206 of the terminal 202 to communicate with one or multiple other nodes connected on the multidrop cable 200 through the transmission lines 204.

Figure 10:
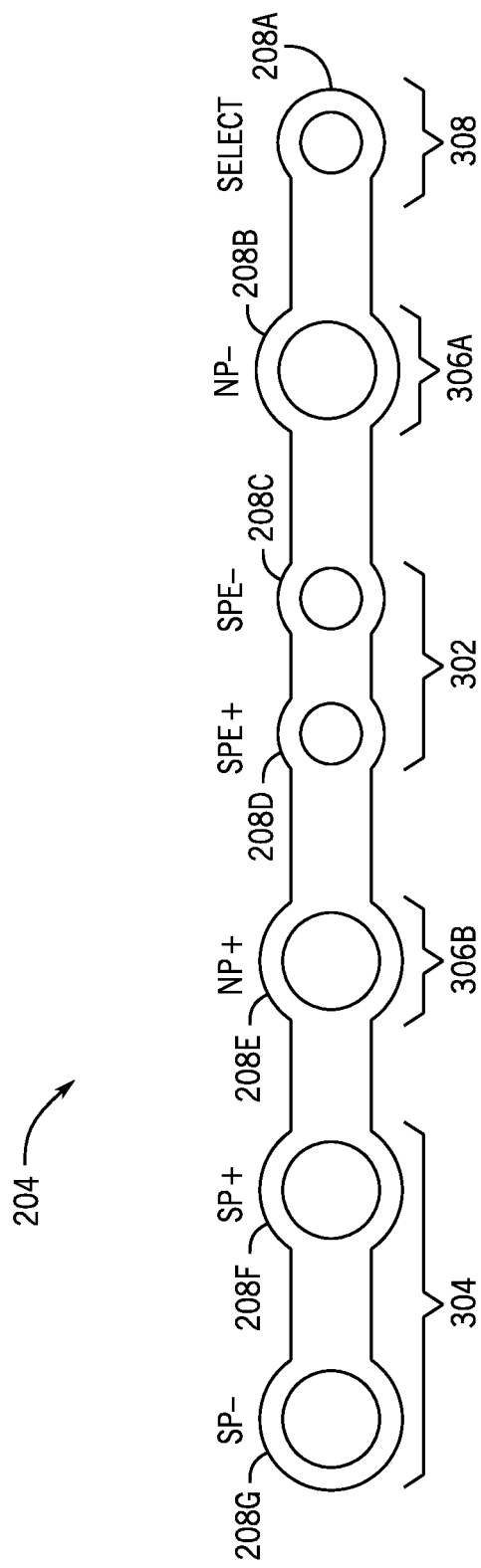
FIG. 10 is a cross-sectional view of the portion of the multidrop cable shown in FIGS. 8 and 9, in accordance with embodiments presented herein.

FIG. 10 depicts a cross-sectional side view of an embodiment of the transmission lines 204 of the multidrop cable 200 using EtherNet/IP protocol. It should be noted that the multidrop cable 200 is not intended to be limited to the EtherNet/IP protocol or the depicted conductors 208A-208G shown in FIG. 10. The multidrop cable 200 may employ other communication protocols and/or other combination of conductors in different embodiments. Also, the transmission lines 204 may include cables with different wire gauge or conductive materials for different applications.

The transmission lines 204 may include single pair Ethernet (SPE) conductors 302, a switched power (SP) 304 pair, a pair of network power (NP) conductors 306A and 306B, and a select line conductor 308. The SPE 302 may include a first and a second conductor to enable transmission of a differential signal. In certain embodiments, the SPE 302 may be a single pair Ethernet cable and the SP 304 and the NP 306A and 306B may carry Direct Current (DC) power. The SPE 302 conductors may transmit communication signals and the SP 304 conductors may transmit signals in the form of switched electrical power between different nodes. In some embodiments, the SPE 302 and/or the SP 304 may deliver electrical power to one or multiple nodes to power actuators, contactors, and sounders, among other things. The NP 306A and NP 306B conductors may provide electrical power to one or multiple nodes. In some embodiments, the NP 306A and NP 306B conductors may power the communication circuits and/or microcontrollers of the respective one or multiple nodes. Furthermore, the select line conductor 308 may communicate a select line signal to facilitate identification and configuration of nodes. The select line conductor 308 may transmit communication signals and/or facilitate communication or transmission of power signals by the SPE 302 conductors and/or the SP 304 conductors. For example, the select line conductor 308 may include identification numbers associated with selection of a node on the multidrop cable 200. It should be noted that in different examples a selected node by the select line conductor 308 may perform different functions associated with the selected node.

To improve operation of industrial automation systems, components of the industrial automation system (e.g., supervisory control system) may monitor performance of one or more devices (e.g., operator control station) with respect to the industrial automation process as a whole. Statuses and/or information from the one or more components (e.g., supervisory control system) may be transmitted to respective control systems of drives associated with the one or more devices via an Ethernet network. Respective control systems of the drives may use the statuses and/or information to make control decisions related to the one or more devices controlled or coupled to the drive. As mentioned above, each drive may be housed in a control cabinet associated with the industrial automation system, and each drive may include a control system to control operations of respective components (e.g., load devices, motor). To enable the supervisory control system to receive statuses and/or information from the one or more devices (e.g., operator control station), each device may be connected to an Ethernet network. In some cases, each device may be connected to the Ethernet network via a separate Ethernet cable. However, wiring each device to the Ethernet network via an Ethernet cable may be cumbersome, cost inefficient, and result in a bundle of Ethernet cables, which may be difficult to maintain.

As such, it may be desirable to connect operator control stations to the Ethernet network while reducing the number of wires and overall installation cost, increasing transmission speed, and the like. Accordingly, the present disclosure provides techniques for connecting operator control stations using a single pair Ethernet (SPE) cable. By employing the techniques described in the present disclosure, the systems described herein may allow for connecting operator control stations to the Ethernet network while reducing the number of wires and overall installation cost, increasing transmission speed, and the like.

While only certain features of the present disclosure have been illustrated and described herein, many modifications and changes will occur to those skilled in the art. It is therefore, to be understood that the appended claims are intended to cover all such modifications and changes as fall within the true spirit of the embodiments described herein.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function]. . . " or "step for [perform]ing [a function]. . . ," it is intended that such elements are to be interpreted under 35 U.S.C. 112(f). However, for any claims containing elements designated in any other manner, it is intended that such elements are not to be interpreted under 35 U.S.C. 112(f).

What is claimed:

1. An operator control station of an industrial automation system, comprising:
   at least one input interface configured to receive a user input;
   a communication interface configured to communicate with one or more devices of the industrial automation system, including a first device via an Ethernet communication protocol;
   a controller communicatively coupled to the communication interface, wherein the controller is configured to perform operations comprising:
      generating a signal based on the user input, wherein the signal is configured to instruct the first device to control at least one component of the industrial automation system; and
      providing the signal to the communication interface for transmission to the first device via the Ethernet communication protocol;
   wherein the communication interface is configured to transmit the signal to the first device via an In-cabinet Bus infrastructure, wherein the In-cabinet Bus infrastructure comprises at least seven conductors, wherein the at least seven conductors comprise:

a Single Pair Ethernet (SPE) pair, wherein the SPE pair is configured to implement an SPE communication protocol;
a switched power pair;
a network power pair; and
a select line.

2. The operator control station of claim 1, wherein the at least one input interface comprises a push button, a selector switch, a pilot light, or any combination thereof.

3. The operator control station of claim 1, wherein the at least one input interface comprises a first interface comprising a switch and a second interface comprising a push button.

4. The operator control station of claim 3, wherein the at least one input interface comprises a third interface comprising a selector switch.

5. An industrial automation system, comprising:
a drive configured to receive a first alternative current (AC) voltage from a power source and provide a second AC voltage to a load device, the drive including a control system;
at least one input interface configured to receive a user input;
a communication interface configured to communicate with the drive and communicatively coupled to the control system, wherein the communication interface is configured to communicate using an Ethernet communication protocol;
a controller communicatively coupled to the communication interface, wherein the controller is configured to perform operations comprising:
generating a signal based on the user input, wherein the signal is configured to instruct the control system to operate the drive; and
providing the signal to the communication interface for transmission to the drive via the Ethernet communication protocol;
wherein the communication interface is configured to transmit the signal to the control system via an In-cabinet Bus infrastructure, wherein the In-cabinet Bus infrastructure comprises at least seven conductors, wherein the at least seven conductors comprise:
a Single Pair Ethernet (SPE) pair, wherein the SPE pair is configured to implement an SPE communication protocol;
a switched power pair;
a network power pair; and
a select line.

6. The system of claim 5, comprising a gateway communication device communicatively coupled to the communication interface via the at least seven conductors.

7. The system of claim 6, wherein the gateway communication device is configured to receive signals via the SPE communication protocol.

8. The system of claim 6, wherein the gateway communication device is communicatively coupled to the drive via the at least seven conductors.

9. The system of claim 6, comprising a starter communicatively coupled to the gateway communication device via the at least seven conductors.

10. The system of claim 6, comprising a device communicatively coupled to the gateway communication device, the device configured to receive signals from the gateway communication device via the SPE communication protocol.

11. The system of claim 6, wherein the select line is configured to communicate a select line signal to facilitate identification of a plurality of nodes of the In-cabinet Bus infrastructure.

12. A method, comprising:
receiving, via a user input interface of an operator control station, a user input, wherein the operator control station comprises a communication interface configured to communicate with one or more devices of an industrial automation system, including a first device via an Ethernet communication protocol;
generating, via a controller of the operator control station, a signal based on the user input, wherein the signal is configured to instruct the first device to control at least one component of the industrial automation system;
providing the signal to the communication interface for transmission to the first device according to a Single Pair Ethernet (SPE) communication protocol; and
transmitting the signal via the communication interface to the one or more devices via an In-cabinet Bus infrastructure, wherein the In-cabinet Bus infrastructure comprises at least seven conductors, wherein the at least seven conductors comprise:
an SPE pair, wherein the SPE pair is configured to implement an SPE communication protocol;
a switched power pair;
a network power pair; and
a select line.

13. The method of claim 12, wherein the signal comprises an internet-protocol (IP) address associated with the operator control station.

14. The method of claim 12, comprising transmitting, via the communication interface, the signal to a gateway communication device of an industrial automation system according to the SPE communication protocol.

15. The method of claim 12, wherein the user input interface comprises a push button, a pilot light, a selector switch, a toggle switch, a pendant station, or any combination thereof.

16. The method of claim 12, wherein the communication interface is communicatively coupled to the operator control station via a plurality of SPE conductors.

* * * * *